July 3, 1928.
R. J. GITS
1,676,086
LUBRICATING MEANS
Filed Dec. 14, 1927
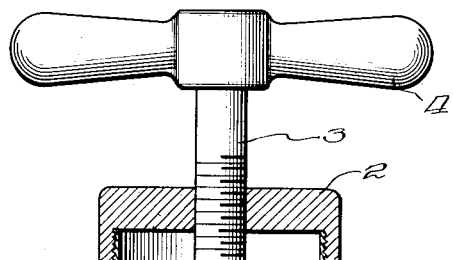
Fig. 1.
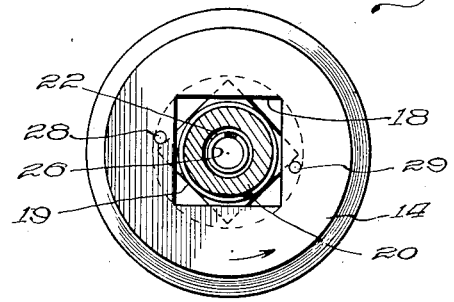
Fig. 2.
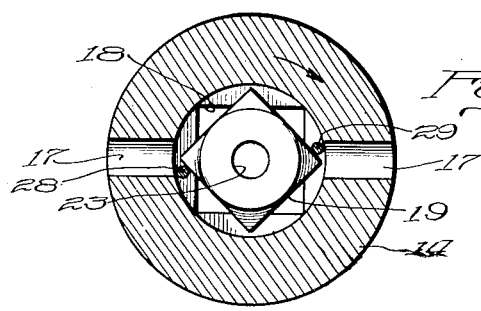
Fig. 3.
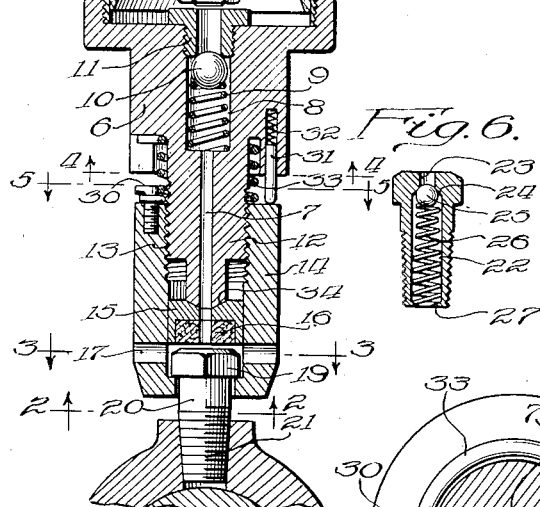
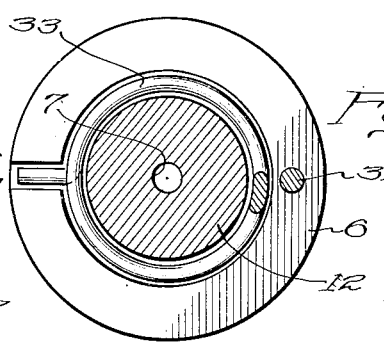
Fig. 6. Fig. 4.
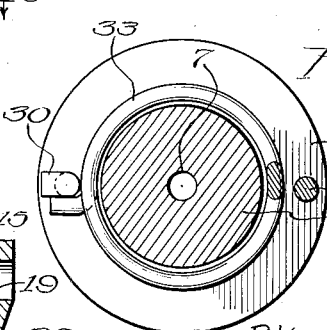
Fig. 5.
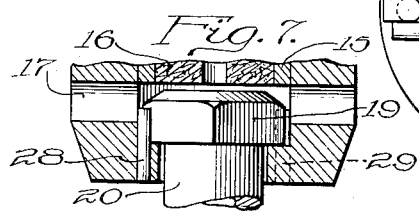
Fig. 7.
Inventor:
Remi J. Gits
By Wm. E. Hann
Atty.

Patented July 3, 1928.

1,676,086

UNITED STATES PATENT OFFICE.

REMI J. GITS, OF CHICAGO, ILLINOIS, ASSIGNOR OF ONE-THIRD TO WILLIAM E. HANN, OF CHICAGO, ILLINOIS.

LUBRICATING MEANS.

Application filed December 14, 1927. Serial No. 239,986.

This invention relates to a high pressure lubricating system and apparatus particularly adaptable for use in lubricating the chassis of motor vehicles.

The main objects of this invention are to provide an improved form of high pressure lubricator, lubricant receiving nipple for attachment to a bearing, and coupling member for detachably connecting the lubricator to the nipple; to provide a lubricator that can be operated with one hand of the user; to provide an improved coupling which secures a sealed connection between the lubricator and nipple of a tightness that is in accordance with the resistance met by the lubricant entering the bearing being lubricated; to provide an improved form of lubricant receiving nipple that can be manufactured from steel instead of brass and that requires a lesser amount of stock than nipples now in common use; and to provide a lubricant receiving nipple which protrudes only a slight distance from the bearing to which is is applied.

An illustrative embodiment of this invention is shown in the accompanying drawings, in which:—

Figure 1 is a sectional view of a grease gun or compressor with the improved discharge member and coupling member in position on the lubricant receiving member or nipple.

Fig. 2 is an enlarged sectional view taken on the line 2—2 of Fig. 1.

Fig. 3 is an enlarged sectional view taken on the line 3—3 of Fig. 1.

Fig. 4 is an enlarged sectional view taken on the line 4—4 of Fig. 1.

Fig. 5 is an enlarged sectional view taken on the line 5—5 of Fig. 1.

Fig. 6 is a sectional view of the lubricant receiving nipple.

Fig. 7 is an enlarged fragmentary detail showing the pins on the coupling member which limit relative rotation between said member and the lubricant receiving nipple.

In the construction shown in the drawings an elongated tubular lubricant reservoir 1 is closed at one end by a cap 2 threaded or otherwise detachably secured thereon. The cap 2 carries a piston rod 3 axially threaded therethrough which has a handle 4 rigidly secured to the outer end thereof for manually rotating the rod. The opposite or inner end of the piston rod 3 carries a piston 5 rotatably mounted thereon for forcing lubricant out of the reservoir 1 under pressure.

The end of the reservoir 1 opposite to the cap 3 is provided with a discharge nozzle 6 which has an axial bore 7 therethrough for conducting lubricant from the reservoir 1 to a lubricant receiving member or nipple. The upper end of bore 7 is enlarged at 8 to house a helical compression spring 9 which normally holds a ball valve 10 against its valve seat. Said valve seat is formed on the lower face of a tubular bushing 11 screwed into the upper end of the enlarged bore 8.

The lower end 12 of the discharge nozzle 6 is preferably of reduced diameter and is provided with external threads 13 which engage an internally threaded tubular coupling member or sleeve 14. The sleeve 14 slidably houses a tubular bushing 15 which has an axial bore therethrough in registry with the passageway 7. The face of the bushing 15, adjacent the nozzle portion 12, is preferably concave as shown at 34 to form an annular seat to receive the tip end of the discharge nozzle which is convexly tapered at the same angle so that a tight metal to metal connection is made when the two parts are tightly pressed together. The opposite face of the bushing 15 is countersunk to house a gasket 16 of suitable material such as leather or composition. The walls of the sleeve 14 adjacent the gasket 16 are provided with a plurality of radially disposed vent holes 17 for permitting excess grease or dirt to pass out therethrough.

The lower end of the coupling sleeve 14 is provided with a square hole 18 therethrough which is adapted to readily slip over the square head 19 of a lubricant receiving member or nipple 20. The lubricant receiving member 20 is preferably turned from a square steel rod and the end thereof opposite to the head 20 is provided with external threads 21 for screwing it into the bearing to be lubricated. Lubricant is communicated to the bearing through an axial bore 22 in the member 20. The outer end 23 of the bore 22 is of reduced diameter so as to provide a valve seat 24 against which a ball valve 25 is normally urged by a compression spring 26. The spring 26 is housed in the bore 22 and bears between the ball valve 25 and an inwardly turned flange 27 formed at the lower end of the bore 22.

The internal diameter of the coupling member 14, inward of the square opening 18, is of sufficient size to permit the square head 19 to be rotated relatively thereto. Means are provided for limiting such relative rotation to substantially ⅛ of a revolution and comprises a pair of hardened steel pins 28 and 29 mounted in the lower end of the member 14. These pins are positioned so as to engage the square corners of the head 19 and prevent further relative rotation in the same direction.

The upper face edge of the coupling member 14 is provided with an upstanding protruding pin 30 which coacts with a plunger 31 slidably mounted in member 6 and normally urged downwardly against the upper face edge of the coupling member 14 by a helical compression spring 32. The coupling member 14 is normally held with the pin 30 contacting with the plunger 31 by a torsion spring 33, one end of which is anchored in a slot in the member 6, and the other end of which is connected to the coupling member 14 by hooking around the pin 30. The torsion spring 33 is arranged to rotate the member 14 to the left with respect to the member 6 so as to withdraw the lower end of the nozzle member 6 and bushing 15, inward from the square opening 18 in the lower end of the member 14.

In the operation of this lubricating means the cap 2 is removed and the reservoir 1 filled with lubricant in the usual manner. Bearings to be lubricated are each equipped with one of the lubricant receiving members or nipples 20 threaded thereinto, the square head 19 being used to fit a wrench thereon for this purpose. The handle 4 of the grease gun is grasped by the user and the outer end of the coupling member 14, which has the square opening 18 therein, is shifted axially toward the nipple 20 and slipped over the square head 19 until the outer face thereof is snugly against the gasket 16 of bushing 15.

The handle 4 is then turned to the right, thus turning the reservoir 1 and coupling member 14 also to the right. When the coupling member 14 has rotated substantially one-eighth of a revolution relatively to the head 19, as shown in Figs. 2, 3 and 7, two of the square corners of the head abut against the pins 28 and 29, thus preventing further relative rotation in that direction. Continued rotation of the handle 4 then rotates the reservoir 1 and nozzle 6 relatively to the sleeve 14, thus causing the threaded shank 12 to be screwed down into the sleeve 14 and force the gasket 16 into sealing contact with the face of the nipple 20. After the gasket 16 has contacted with the nipple 20, the bushing 15 will stop rotating and continued rotation of the nozzle 6, relative to the sleeve 14, will be permitted through the metal to metal tapered contact 34.

When a tight sealing fit has been effected from the nozzle 6 to the nipple 20, further rotation of the handle 4 will rotate the threaded piston rod 3 relatively to the cap 2, and force the piston 5 downwardly in the reservoir 1. Such movement of the piston 5 will force the lubricant out of the reservoir 1, opening the ball valve 10 against the action of spring 9, and the lubricant will be discharged through the bore 7 in the nozzle 6, into the lubricant receiving member or nipple 20. The check valve 25 in the nipple 20 will also be forced from its seat and the lubricant will be communicated to the bearing.

The effectiveness of the sealing connection between the gasket 16 and the nipple 20 is always maintained, due to the fact that the greater the resistance encountered in forcing the lubricant into the bearing, the tighter the sealing connection is made by reason of the rotation of the handle 4.

After the bearing is sufficiently lubricated the handle 4 is turned in the opposite direction, that is to the left. Such rotation will turn the nozzle 6 relative to the coupling sleeve 14, thus loosening the sealing connection with the nipple 20. As soon as the connection is loosened, the torsion spring 33 will rotate the sleeve 14 relatively to the nozzle 6 until the plunger 31 contacts with the stud 30. The grease gun unit is then removed from the nipple 20 by turning the gun until the square opening 18 registers with the square head 19 of the nipple 20.

Although but one specific embodiment of this invention has been herein shown and described, it will be understood that numerous details of the construction shown may be altered or omitted without departing from the spirit of this invention as defined by the following claims.

I claim:

1. In a lubricating apparatus of the character described, connecting means comprising a lubricant ejection nozzle communicating with a source of lubricant under pressure, a lubricant receiver affixable to the object of lubrication, and a coupling connecting said nozzle and receiver, said receiver and coupling having endwise interfitting and limited turning swivel connection, and said coupling and nozzle having threaded connection for moving said nozzle relatively to said receiver when rotated relatively thereto, the said threaded and swivel connections being closed by the same direction of torque.

2. In a lubricating apparatus of the character described, the combination of a discharge nozzle communicating with a source of lubricant under pressure, a coupling member threaded on said nozzle, a lubricant receiving member, one of said members being adapted to slidably embrace the other when shifted axially relatively thereto, a coacting swivel connection between said members for detachably interlocking them together when rotated relatively to each other, a connection between said nozzle and sleeve whereby continued rotation of said nozzle in the same direction relatively to said members will cause said nozzle to effect a sealed lubricant conducting connection with said lubricant receiving member.

3. In a lubricating device of the class described, a lubricant receiving nipple, a lubricant discharging nozzle communicating with a source of lubricant under pressure, and a sleeve engaging said nozzle and having a limited swivel connection with said nipple to positively lock the same together, said nozzle when rotated being movable axially through the sleeve to engage the nipple, the said sleeve and nozzle being operable, by turning in the same direction, to lock the sleeve and nipple together and effect a seal between the nozzle and nipple, and means for rotating the nozzle.

4. In a lubricating device of the character described, a lubricant receiving nipple having an abutment thereon, a nipple engaging sleeve having a stop thereon engaging the abutment on the nipple when turned a limited degree to hold the sleeve stationary, a detachable swivel connection to positively lock the sleeve and nipple together, a nozzle communicating with a source of lubricant under pressure engaging said sleeve for axial movement therethrough and into engagement with the nipple to effect a sealed communication therebetween, the said nozzle moving into engagement with the nipple after the sleeve has reached its limit of movement, the locking of the sleeve to the nipple and the establishing of a seal between the nozzle and nipple being effected by rotation of the nozzle in one direction relative to the nipple.

5. In a lubricating device of the class described, the combination of a lubricant discharging nozzle communicating with a source of lubricant under pressure, a coupling sleeve, a lubricant receiving nipple, said sleeve being adapted to embrace said nipple when in axial alignment therewith, said sleeve and nipple having a detachable turning swivel connection for locking together upon relative rotation therebetween, means for limiting such relative rotation, and a threaded connection between said sleeve and nozzle for moving said nozzle to engage said nipple after said swivel locking has been effected.

6. In a lubricating device of the class described, the combination of a lubricant discharge nozzle communicating with a source of lubricant under pressure, a lubricant receiving nipple affixable to the object of lubrication, a coupling sleeve connecting said nozzle and nipple, said sleeve and nipple having limited turning swivel connection, and said sleeve and nozzle having a threaded connection for moving said nozzle relatively to said nipple when rotated relatively thereto, a tubular bushing axially slidable in said sleeve between said nozzle and nipple, and a gasket between the outer face of said bushing and said nipple, the other face of said bushing having metal to metal contact with the end of said nozzle.

7. A device of the character described in claim 6, in which the outer face of the bushing is recessed and the gasket is housed in said recess so as to be carried by said bushing.

8. A device of the character described in claim 1, in which a torsion spring is provided for engaging the nozzle and coupling sleeve to rotate said parts relatively to each other, in a direction opposite to the direction of locking engagement.

9. A device of the character described in claim 1, in which the lubricant receiver has a rectangular head with overhanging corners and the coupling is provided with undercut walls for engaging said head when in telescoped relation thereto and rotated relatively thereto.

Signed at Chicago this 5th day of December, 1927.

REMI J. GITS.